(12) United States Patent
Patton

(10) Patent No.: US 11,576,293 B2
(45) Date of Patent: Feb. 14, 2023

(54) AGRICULTURAL PLANTER DEPTH CALIBRATION BLOCK

(71) Applicant: Blake Paul Patton, Oakdale, IL (US)

(72) Inventor: Blake Paul Patton, Oakdale, IL (US)

(*) Notice: Subject to any disclaimer, the term of this patent is extended or adjusted under 35 U.S.C. 154(b) by 382 days.

(21) Appl. No.: 16/946,759

(22) Filed: Jul. 6, 2020

(65) Prior Publication Data

US 2022/0000004 A1 Jan. 6, 2022

(51) Int. Cl.
| | |
|---|---|
| A01B 63/00 | (2006.01) |
| A01C 5/06 | (2006.01) |
| G01B 5/18 | (2006.01) |
| G01B 3/30 | (2006.01) |

(52) U.S. Cl.
CPC ............ *A01B 63/008* (2013.01); *A01C 5/064* (2013.01); *G01B 3/30* (2013.01); *G01B 5/18* (2013.01)

(58) Field of Classification Search
CPC ......... A01B 63/008; A01C 5/064; A01C 5/02; A01C 7/203; G01B 5/18; G01B 3/30
USPC ........................ 33/567, 567.1, 613, 624, 625
See application file for complete search history.

(56) References Cited

U.S. PATENT DOCUMENTS

| | | | |
|---|---|---|---|
| 1,330,608 A | 2/1920 | Pieper | |
| 1,573,327 A | 2/1926 | Resseguie | |
| 2,336,393 A | 12/1943 | Combes | |
| 3,126,847 A | 3/1964 | Morris | |
| 4,218,981 A | 8/1980 | Kelly | |
| 4,691,645 A | 9/1987 | Anderson | |
| 5,325,798 A | 7/1994 | Nowell et al. | |
| 5,450,678 A | 9/1995 | Check | |
| 5,642,569 A * | 7/1997 | Palmer | G01B 3/08 33/809 |
| 6,148,747 A | 11/2000 | Deckler et al. | |
| 7,216,595 B2 | 5/2007 | Steiner | |
| 7,360,494 B2 | 4/2008 | Martin | |
| 9,456,544 B2 | 10/2016 | Wehler et al. | |
| 9,943,028 B2 | 4/2018 | Berendsen et al. | |
| 10,080,323 B2 | 9/2018 | Lund et al. | |
| 10,506,758 B2 | 12/2019 | Sauder et al. | |
| 10,537,055 B2 | 1/2020 | Gresch et al. | |
| 2008/0011208 A1 | 1/2008 | Martin | |
| 2013/0000536 A1 | 1/2013 | Schilling | |
| 2017/0172058 A1 | 6/2017 | Lund et al. | |
| 2017/0359944 A1 | 12/2017 | Sauder et al. | |
| 2020/0068776 A1 | 3/2020 | North et al. | |

FOREIGN PATENT DOCUMENTS

| | | | |
|---|---|---|---|
| CN | 105865301 A | * 8/2016 | |
| DE | 3325366 A | * 1/1984 | ............... G01B 3/30 |

OTHER PUBLICATIONS

International Search Report and Written Opinion; PCT/US2021/070682; dated Sep. 1, 2021.

* cited by examiner

*Primary Examiner* — Alicia Torres
(74) *Attorney, Agent, or Firm* — Dunlap Bennett & Ludwig, PLLC

(57) ABSTRACT

A calibration block provides a deck with a slot for receiving a first plate for supporting a distal end of the planter unit when setting its gauge wheels, whereby the first plate is flush with the deck at a predefine distance from the soil. The calibration block also provides a gauge block and associated second plate for increasing the predefined distance.

6 Claims, 4 Drawing Sheets

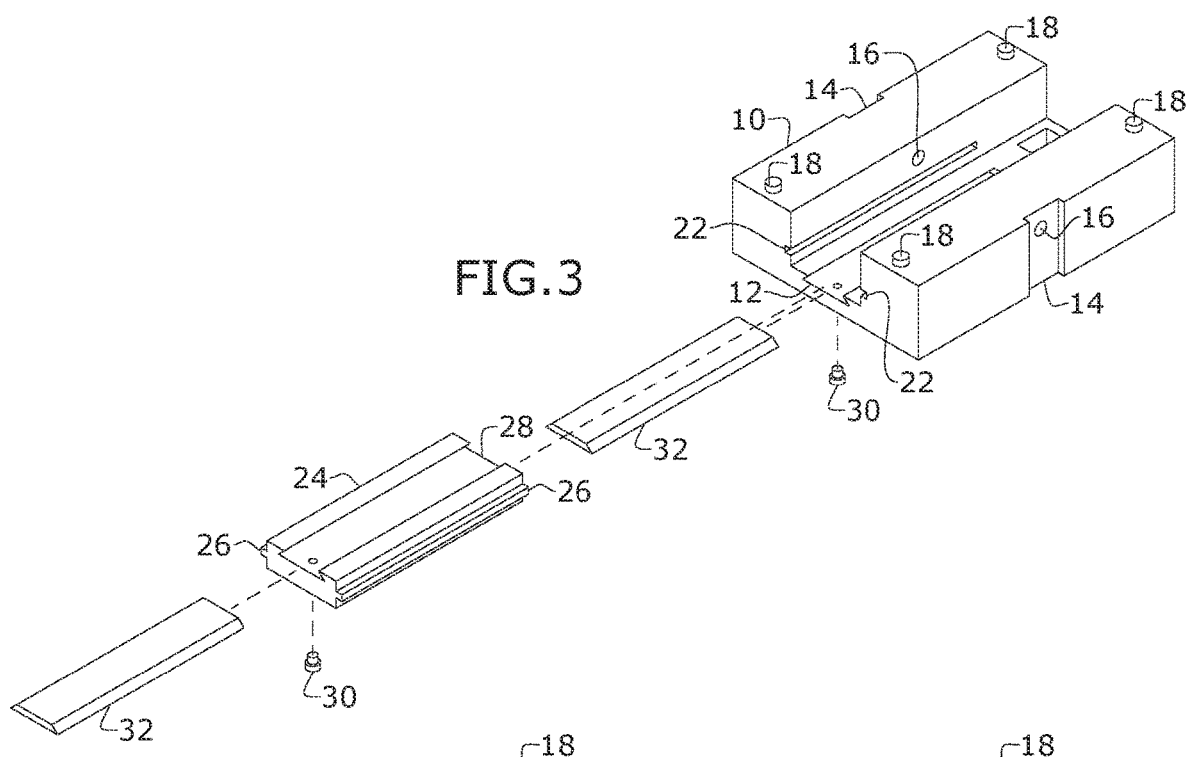
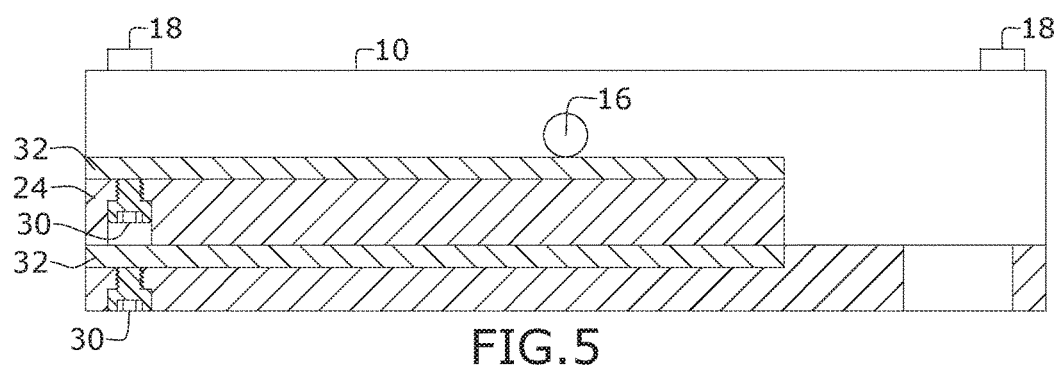

AGRICULTURAL PLANTER DEPTH CALIBRATION BLOCK

BACKGROUND OF THE INVENTION

The present invention relates to agricultural equipment and, more particularly, to a seed planter depth calibration block for selectively setting a furrow depth resulting from use of a seed planter for consistently and repeatable seed delivery of the seed planter, row after row.

Current systems for delivering seeds to the furrow typically use wooden blocks. Wooden blocks, however, are not always precise, leading to inconsistent seeding depth as wooden blocks first need to be ripped to the predetermined soil depth (such as two inches) and over time get worn down in size due to the soft nature of wood. Furthermore, the seed/furrow depth in the field is a function of the soil characteristics; specifically, soil levels and densities, which typically vary thereby decreasing the chances of repeatably carving out the same furrow depth row after row. As a result, currently planter operators manually measure the depth of the seed planter's disk in the soil or use wooden blocks that may not define a true depth.

As can be seen, there is a need for prefabricated calibration blocks for improving the consistency of seed planter's furrow depth when delivering agricultural seed to a furrow.

The present invention embodies a hard, weather-proof calibration block combined with a metal plate for selectively defining a repeatable, consistent soil depth when carving out a furrow and delivering agricultural seed to the furrow. The calibration block sets the gauge wheels to the predefined soil depth for most all large-scale planters. Accordingly, setting the depth with this calibration block will eliminate variance across the planter units and among the different rows of furrows to be formed.

SUMMARY OF THE INVENTION

In one aspect of the present invention, calibration block for planter units includes the following: a body of a first material, the body having a deck and a hull, the deck having a first predefined elevation from an underside of the body; a first insertion slot is provided along the deck; and a side slot along each inner side surfaces of the hull, upward of the deck; a first plate dimensioned to be received in the first insertion slot so that an upper surface of the first plate is coplanar with the first predefined elevation; a gauge insert dimensioned to slide into the side slots so that a top surface of the gauge insert is a second predefined elevation above the first predefined elevation; a second insertion slot in said top surface; a second plate dimensioned to be received in the second insertion slot so that an upper surface of the second plate is coplanar with the second predefined elevation, wherein the first and second predefined elevations are each one inch, wherein the body and the gauge insert are a plasticized material and the first and second plates are a metallic material; recessed grooves along an exterior surface of the hull; and a carrier for engaging said recessed grooves for handling a plurality of calibration blocks in a stacked configuration; and stacking pegs along gunwales of the hull; and stacking peg holes along said underside of the body for mating with adjacent calibration blocks in the stacked configuration.

In another aspect of the present invention, a method of predictably setting a furrow depth for a planter unit includes providing an above-mentioned calibration block and lowering the planter unit so that its gauge wheels rest on the hull and a disk opener of the planter unit is resting on the first plate.

These and other features, aspects and advantages of the present invention will become better understood with reference to the following drawings, description and claims.

BRIEF DESCRIPTION OF THE DRAWINGS

FIG. 3 is an explosive perspective view of an exemplary embodiment of the calibration block assembly of the present invention;

FIG. 4 is a section view of an exemplary embodiment of the present invention, taken along line 4-4 of FIG. 2;

FIG. 5 is a section view of an exemplary embodiment of the present invention, taken along line 5-5 of FIG. 2;

DETAILED DESCRIPTION OF THE INVENTION

Figure 1:
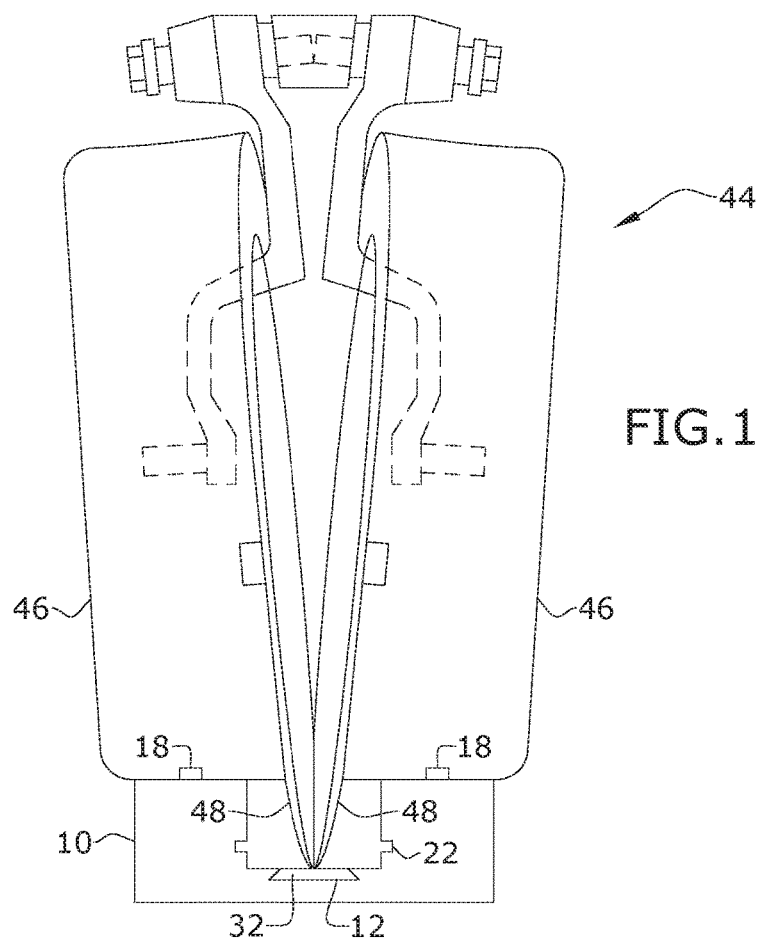
FIG. 1 is an end view of an exemplary embodiment of the present invention, shown in use.
Figure 2:
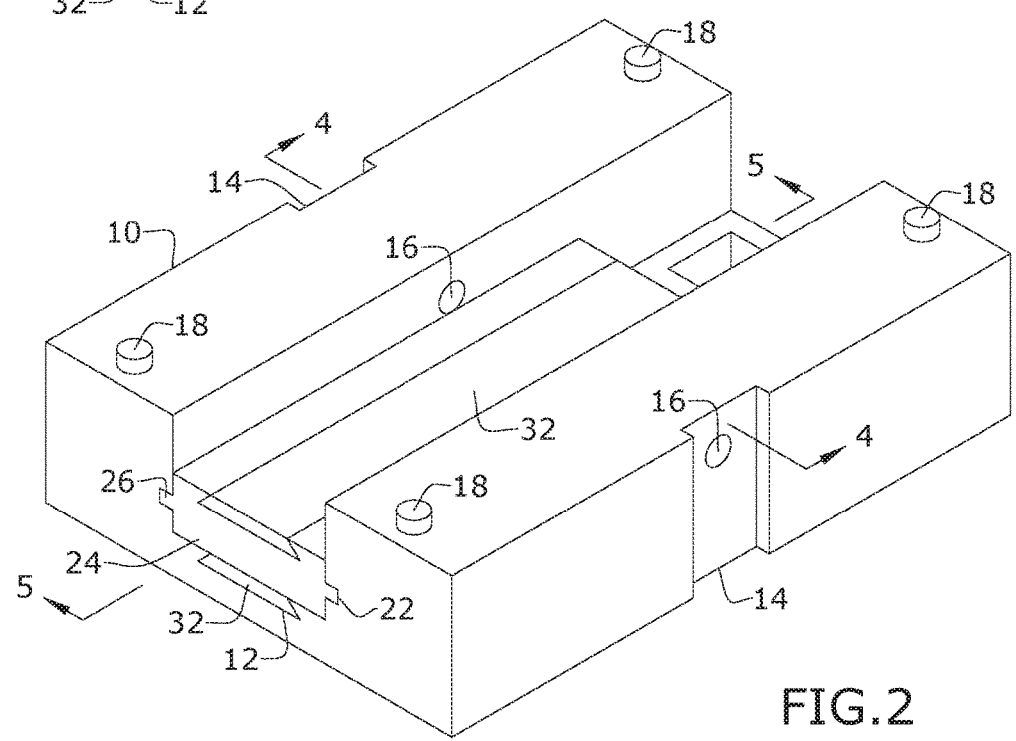
FIG. 2 is a perspective view of an exemplary embodiment of a calibration block assembly of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a calibration block dimensioned and adapted to set a consistent, repeatable furrow depth for planter units. The calibration block provides a deck with a slot for receiving a first plate for supporting a distal end of the planter unit when setting its gauge wheels, whereby the first plate is flush with the deck at a predefine distance from the soil. The calibration block also provides a gauge block and associated second plate for increasing the predefined distance, if the user so desires.

Referring to FIGS. 1 through 8, the present invention may include a calibration block 10 made from a durable, resilient, weather-proof material, such as various plasticized materials or the like. The calibration block 10 provides a hull for a deck that provides a first insertion slot 12 extending longitudinally along the deck, as illustrated in the Figures. The first insertion slot 12 is dimensioned to slidably receive a first plate 32 so that the top surface of each the first plate 32 and the deck are flush.

Slots 22 along opposing inner side surfaces of the hull may be present upward of the deck for slidably receiving the side tongues 26 of a gauge insert 24. A second insertion slot 28 may be recessed in an upper surface of the gauge inset 24, longitudinally extending there along; the second insertion slot 28 is dimensioned to slidably receive another, second plate 32. A fastener 30, such as a bolt, may be used to removably secure the gauge insert 24 and/or first plate 32 to the deck.

The gauge insert 24 may be made of durable, resilient, weather-proof material, such as various plasticized materials or the like. Each plate 32 may be made of a different material than the calibration block 10 and the gauge insert 24, such as various metallic material that can resist and not be damaged by a planter unit 44 disk opener 48 resting on it, as illustrated in FIG. 1.

The thickness of the deck may be a predefined distance, say one inch. So that when the first plate 32 is flush with the deck and supporting the unit 44 disk opener 48, as illustrated in FIG. 1, the distal end of the disk opener 48 is spaced apart one inch from the surface supporting the deck—e.g., the soil. The gauge insert 24 enables users to increase this distance (of the distal end of the disk opener 48 from the soil) by another predefined distance (for a total of two inches). In either configuration, the metallic plate 32 protects the plasticized material of the deck or gauge insert 24 from being damaged when the planter disk openers rest on it during use. With a majority of the material used in the present invention being plasticized, there is no worries of rusting or corrosion from repeated use, all while keeping the material and manufacturing costs low. At the same time, the metal plates may be required to resist damage by the planter unit where the plasticized materials could not. Thereby, there is a "specialization" to the different materials of the plates relative to the remainder of the calibration block 10 that lends itself to the advantages of the present invention.

Figure 6:
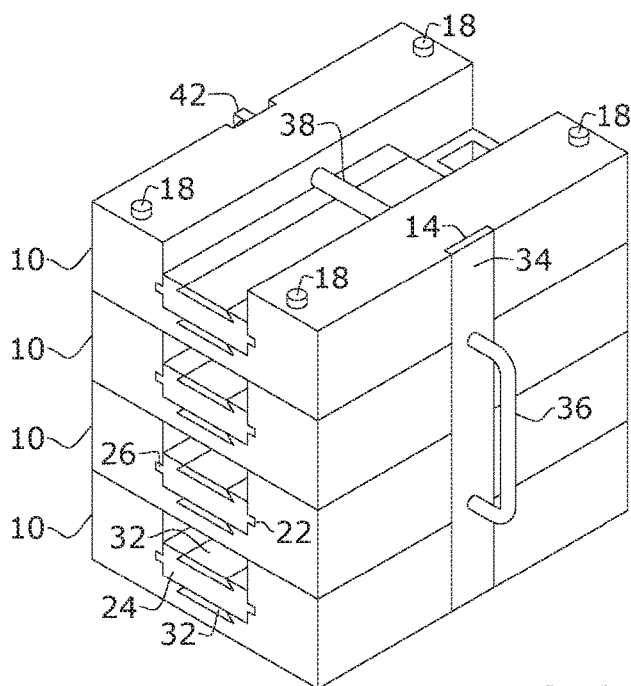
FIG. 6 is a perspective view of an exemplary embodiment of a stacked condition of the calibration block assemblies of the present invention.
Figure 7:
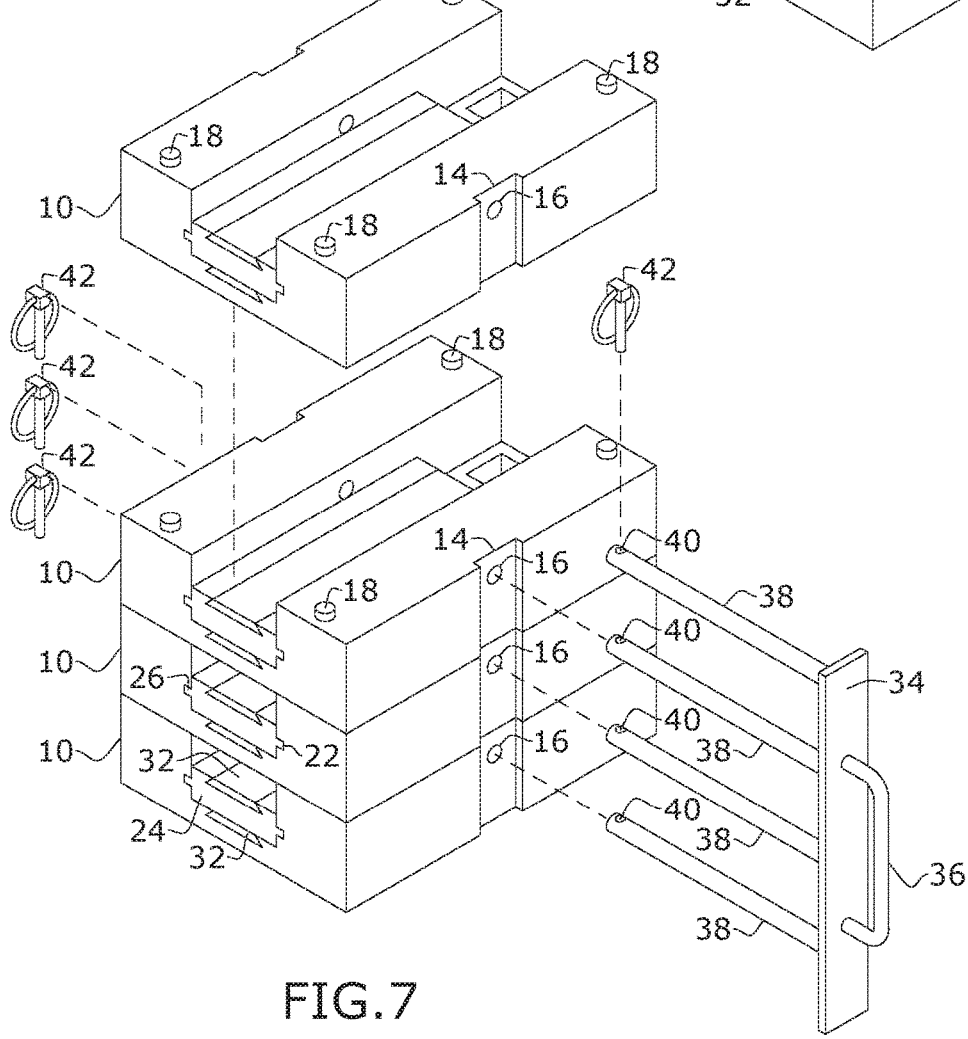
FIG. 7 is an exploded perspective view of an exemplary embodiment of the stacked condition of the calibration block assemblies of the present invention.
Figure 8:
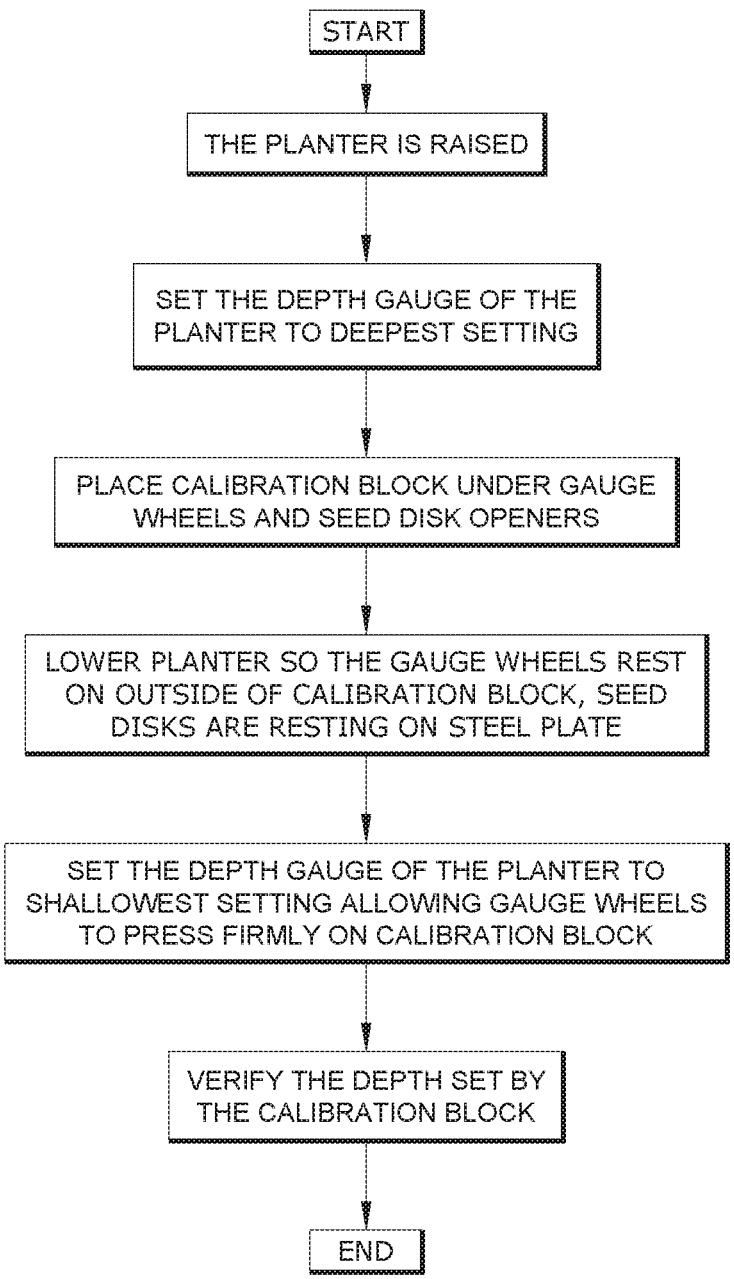
FIG. 8 is a flowchart of an exemplary embodiment of the present invention.

External side surfaces of the hull may provide recessed grooves 14 for engaging a carrier 34 adapted to carry a plurality of calibration blocks 10 in a stacked condition, as illustrated in FIGS. 6 and 7. Each recessed groove 14 may provide a through hole 16 for slidably received a carrier rod 38 of the carrier 34. Each carrier rod 38 may provide a pin hole 40 at or adjacent to its distal end so that when the carrier rod 38 protrudes through said holes 16—on each side of the hull—a retaining pin 42 can be deployed to secure each carrier rod 38 to its associated hull. The carrier 34 provides a carrier handle 36 or the like for manipulating the carrier 34 and secured calibration blocks 10 for transportation and storage.

The gunwales of the hull may provide stacking pegs 18, while the underside of the deck may provide complementary stacking peg holes 20 for engaging the stacking pegs 18 of an adjacent calibration block 10 in the stacked condition.

After the first plate 32 is fastened to the deck of the calibration block 10, a planter unit 44 disk opener 48 may rest on the first plate 32. Once the planter unit 44 is resting on the first plate 32, the gauge wheels 46 will be set to the predefined distance—i.e., seed/furrow depth—provided by the design of the associated calibration block 10.

A method of using the present invention may include the following. An agriculturist can use the calibration block 10 to solve the problem of inconsistent seed/furrow depths when planting crops. Using the calibration block 10 on each row unit will eliminate manufacturing flaws that create uneven seed/furrow depth between row planter units 14, and from row to row.

A planter unit 44 provides a furrow opening/seed disk opening 48 which is typically positioned between a pair of gauge wheels 46. The depth to which the seed disk opening 48 is allowed to penetrate the ground surface is adjustable by the operator by way of a gauge depth which dictate the relative vertical position between the seed disk opening 48 and the gauge wheels 46 when the gauge wheels 46 are fully engaged with the ground surface.

Prior to creating furrows, which tend to be inconsistent from row to row, a user would utilize the present invention to ensure a consistent furrow depth from row to row. The user may raise the planter unit 44 and the depth gauge of the planter unit 44 set to the deepest setting. Then the user can place the calibration block 10 under the gauge wheels 46 and seed disk opener 48. Then the user may lower the planter unit 44 so that the gauge wheels 46 rest on the gunwales of the calibration block 10, and the seed disk opener 48 is resting on the first plate 32. The user may set the depth gauge of the planter unit 44 to the shallowest setting allowing the gauge wheels 46 to press firmly on the calibration block 10. The user may verify the depth set by way of the calibration block 10 (and the gauge insert 24, if desired) through the setting the gauge wheels 46 to the predefined soil depth for most all large-scale planters. Accordingly, setting the depth with the calibration block 10 will eliminate variance across the planter units 44, ensuring the user of a consistent repeatable furrow depth from row to row.

It should be understood, of course, that the foregoing relates to exemplary embodiments of the invention and that modifications may be made without departing from the spirit and scope of the invention as set forth in the following claims.

What is claimed is:

1. A calibration block for planter units, comprising:
   a body of a first material, the body having a deck and a hull, the deck having a first predefined elevation from an underside of the body;
   a first insertion slot is provided along the deck;
   a side slot along each inner side surfaces of the hull, upward of the deck;
   a first plate dimensioned to be received in the first insertion slot so that an upper surface of the first plate is coplanar with the first predefined elevation;
   a gauge insert dimensioned to slide into the side slots so that a top surface of the gauge insert is a second predefined elevation above the first predefined elevation;
   a second insertion slot in said top surface; and
   a second plate dimensioned to be received in the second insertion slot so that an upper surface of the second plate is coplanar with the second predefined elevation.

2. The calibration block for planter units of claim 1, wherein the first and second predefined elevations are each one inch.

3. The calibration block for planter units of claim 1, wherein the body and the gauge insert are a plasticized material and the first and second plates are a metallic material.

4. The calibration block for planter units of claim 1, further comprising:
   recessed grooves along an exterior surface of the hull; and
   a carrier for engaging said recessed grooves for handling a plurality of calibration blocks in a stacked configuration.

5. The calibration block for planter units of claim 4, further comprising:
   stacking pegs along gunwales of the hull; and
   stacking peg holes along said underside of the body for mating with adjacent calibration blocks in the stacked configuration.

6. A method of predictably setting a furrow depth for a planter unit, comprising:
   providing a calibration block of claim 1; and lowering the planter unit so that its gauge wheels rest on the hull and a disk opener of the planter unit is resting on the first plate.

* * * * *